(12) United States Patent
Henderson

(10) Patent No.: US 6,513,851 B2
(45) Date of Patent: Feb. 4, 2003

(54) STORAGE TRAY FOR USE WITH A TONNEAU COVER ASSEMBLY

(76) Inventor: Jack V. Henderson, 6118 Dunmore Dr., West Bloomfield, MI (US) 48322

( * ) Notice: Subject to any disclaimer, the term of this patent is extended or adjusted under 35 U.S.C. 154(b) by 0 days.

(21) Appl. No.: 10/055,201

(22) Filed: Oct. 29, 2001

(65) Prior Publication Data

US 2002/0089202 A1 Jul. 11, 2002

Related U.S. Application Data

(60) Provisional application No. 60/245,447, filed on Nov. 2, 2000.

(51) Int. Cl.[7] .................................................. B60J 7/10
(52) U.S. Cl. .................................. 296/37.6; 296/100.06
(58) Field of Search ........................... 296/37.6, 100.06; 224/402

(56) References Cited

U.S. PATENT DOCUMENTS

| 4,451,075 A | 5/1984 | Canfield |
| 4,813,735 A | 3/1989 | Avitable |
| 5,174,353 A | 12/1992 | Schmeichel et al. |
| 5,207,470 A | * 5/1993 | Rafi-zadeh |

* cited by examiner

Primary Examiner—Joseph D. Pape
(74) Attorney, Agent, or Firm—Clark Hill PLC

(57) ABSTRACT

A tonneau cover assembly is adapted to be secured to a vehicle having a cargo bed and side walls. The tonneau cover assembly includes a panel that extends between two sides, a front edge and a back edge. The panel is movable between open and closed positions. A hinge mechanism includes first and second attachment brackets wherein the second attachment bracket is secured to the panel. A link mechanism extends between two ends wherein the first end is secured to the panel. A storage tray is secured to the first attachment bracket and the second link end. The storage tray is supported by the panel and moves relative to the panel when the panel moves.

21 Claims, 3 Drawing Sheets

STORAGE TRAY FOR USE WITH A TONNEAU COVER ASSEMBLY

This application claims the benefit of provisional application No. 60/245,447 filed Nov. 2, 2000.

BACKGROUND ART

1. Field of the Invention

This invention relates to a storage tray. In particular, this invention relates to a storage tray fixedly attached to the underside of a rigid tonneau cover so as to expose the contents therein when the tonneau cover is pivoted to an open position.

2. Description of the Related Art

Tonneau covers are becoming increasingly popular as an added option for pickup trucks. The tonneau cover overlies the cargo bed of the pickup truck to provide covered storage in the bed and also improve vehicle aerodynamics.

Pickup trucks are commonly used for storing and transporting items. With the addition of a tonneau cover, ease of access to cargo, especially small cargo, carried in the truck bed is more difficult. A storage compartment within easy access when the tonneau cover is opened enables small cargo to be placed within easy reach and is therefore desirable.

SUMMARY OF THE INVENTION

A tonneau cover assembly is adapted to be secured to a vehicle having a cargo bed and side walls. The tonneau cover assembly includes a panel that extends between two sides, a front edge and a back edge. The panel is movable between open and closed positions. A hinge mechanism includes first and second attachment brackets wherein the second attachment bracket is secured to the panel. A link mechanism extends between two ends wherein the first end is secured to the panel. A storage tray is secured to the first attachment bracket and the second link end. The storage tray is supported by the panel and moves relative to the panel when the panel moves.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
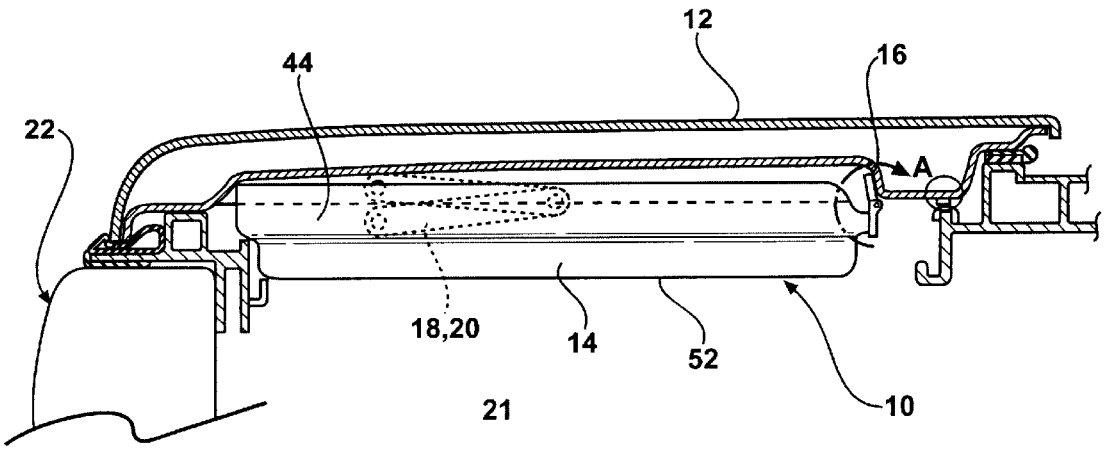
FIG. 1 is a side view of the tonneau cover and storage tray of the present invention in the closed position.

Referring to FIG. 1, a tonneau cover assembly is generally indicated at 10. The tonneau cover assembly 10 includes a panel 12, storage tray 14, a hinge assembly 16, and link assemblies 18, 20. The tonneau cover assembly 10 is a rigid, generally planar panel 12 constructed of plastic, fiberglass, or the like, that is used for covering a cargo bed 21 of a pickup truck 22 and is pivotally attached thereto. In an alternative embodiment, the tonneau cover 10 may be fabric extending over a hard skeletal structure (neither shown).

Figure 3:
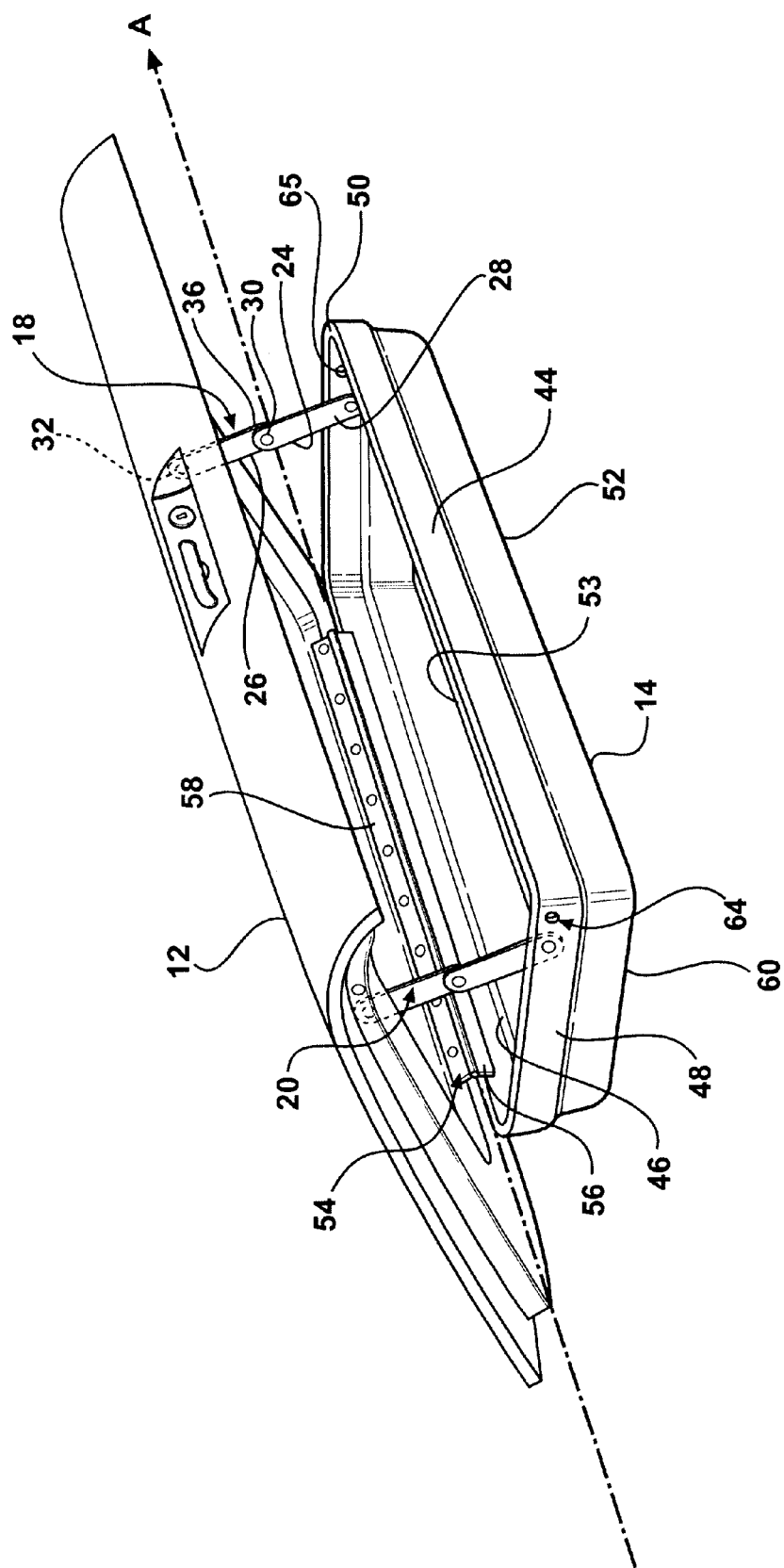
FIG. 3 is a perspective view of the tonneau cover and the storage tray in an open position.

As shown in FIG. 3, the storage tray 14 includes a generally rectangular shape, which is formed from any suitable material such as a thermoset or thermoplastic. The storage tray 14 is mounted to an underside of the panel 12. The tray 14 includes a bottom portion 52 having a position ledge 53. The bottom portion 52 is a generally horizontal plane defined by a perimeter edge 60. Generally parallel front and rear vertical walls 44, 46 are interconnected by generally parallel vertical side members 48, 50, each extending upwardly from the perimeter edge 60 of the bottom portion 52 and defining an interior area. Furthermore, the storage tray 14 may have additional interior walls which form smaller compartmentalized areas.

Figure 2:
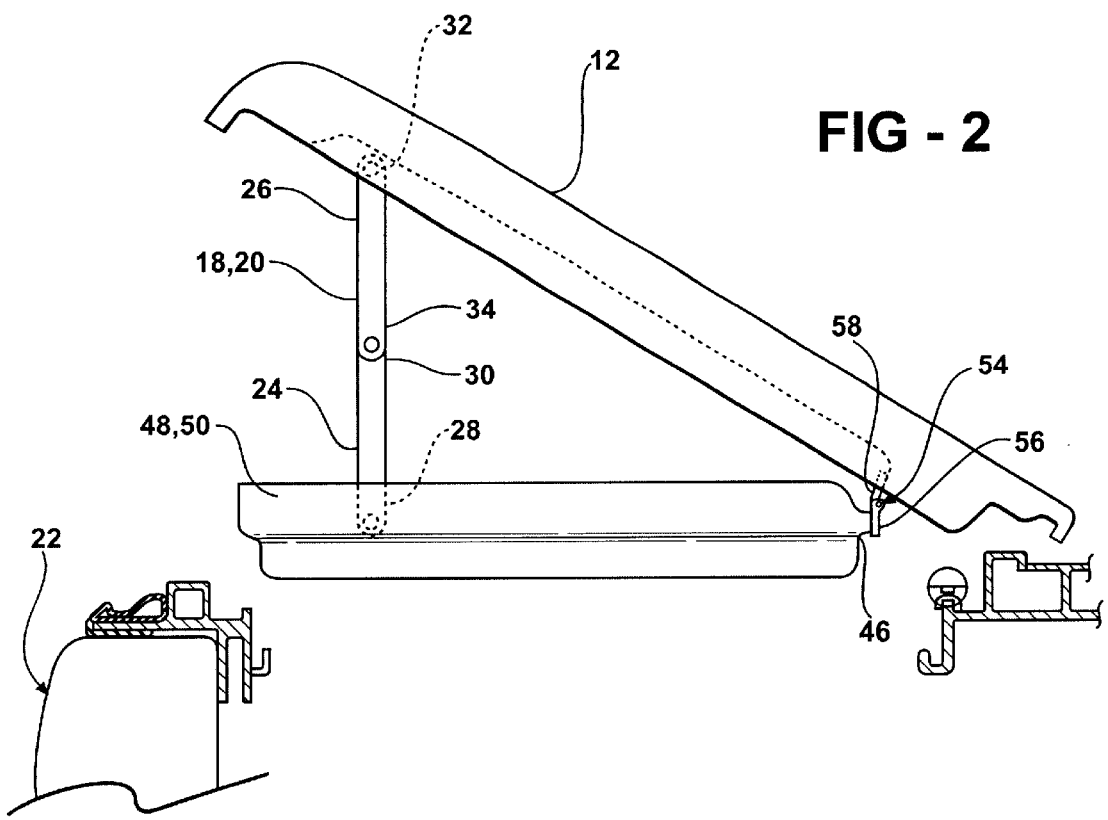
FIG. 2 is a side view of the tonneau cover and the storage tray of the present invention in an open position.

As shown in FIGS. 2 and 3, the hinge assembly 16 is fixedly attached between the storage tray 14 and panel 12. The hinge 16 can be any type of hinge mechanism, i.e., dual hinge, piano hinge, or similar, as known to one of ordinary skill in the art. The hinge 16 has a first attachment bracket 56 which is fixedly attached to the rear wall 46. The hinge 54 further has a second attachment bracket 58 which is fixedly attached to the panel 12. The first and second attachment brackets 56, 58 are pivotally connected together to create pivot axis A for providing rotation between the tonneau cover 12 and the tray 14.

The side members 48, 50 are rotationally connected to the links assemblies 18, 20. The link assemblies 18, 20 are mirror images and, therefore, only link assembly 18 will be described. Referring to FIG. 2, the link assembly 18 includes a first and second link 24, 26. The first link 24 has a first end 28 rotationally connected to the storage tray 14 and a second distal end 30. The second link 26 has a first end 32 which is rotationally connected to the panel 12 and a second distal end 34 which is rotationally connected to the second distal end 30 of the first link 24. The link assemblies 18, 20 can be link type, wire type or a similar mechanism which will prevent further rotational movement of the storage tray 10 when a predetermined position has been reached.

Figure 4:
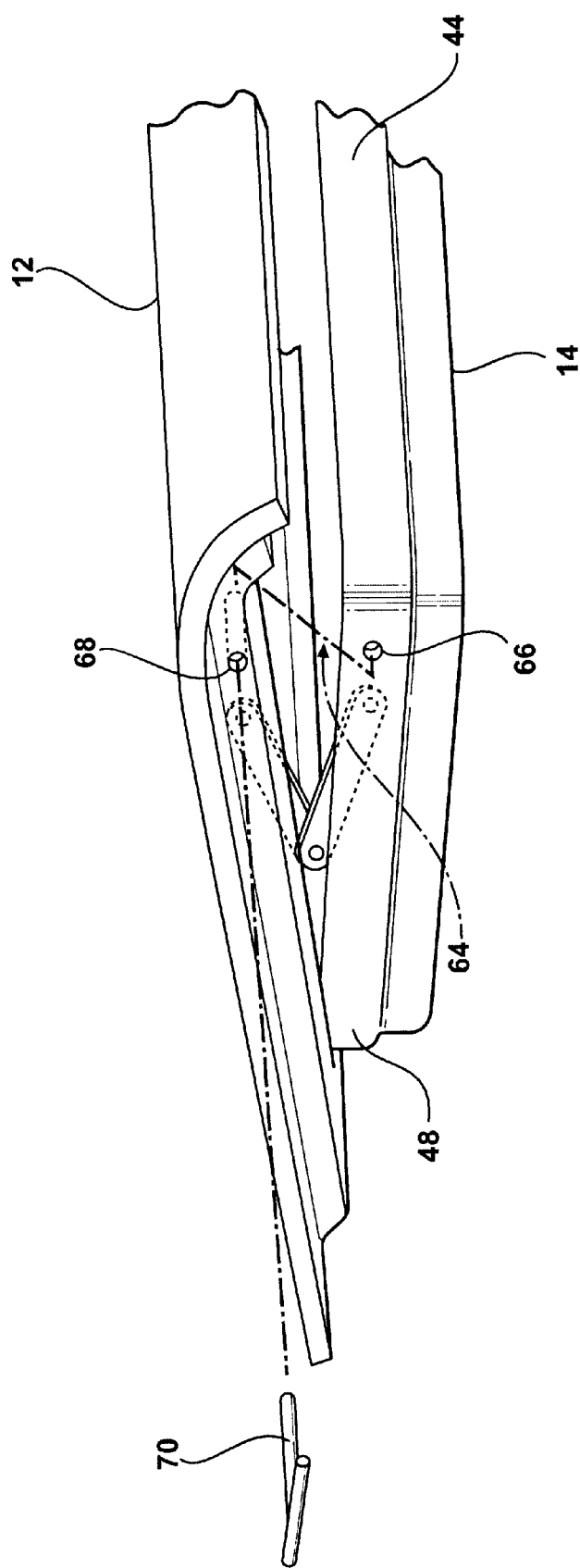
FIG. 4 is a perspective view of the storage tray and tonneau cover illustrating the locked out position.

Referring to FIG. 3, each side wall 48, 50 of the storage tray 14 further includes a tray lockout feature 64, 65. Each tray lockout feature 64, 65 is similar in function and design, therefore, lockout feature 64 will be described. Referring now to FIG. 4, the tray lockout feature 64 includes a tray lockout opening or hole 66 and a tonneau lockout opening or hole 68. The tray lockout opening 66 is mounted such that it corresponds to a similar opposing tonneau lockout opening 68 in the panel 12 when in the closed position. Each lockout opening 66, 68 accepts a lockout pin 70. The lockout pin 70 is generally T-shaped and is used to hold the storage tray assembly 10 in the closed position while the panel 12 is opened to allow for access into the cargo bed 21 of the pickup truck 22. Alternatively, the lockout opening 66 can be located in the front wall 44 of the storage tray 14. It should be recognized that this is one such lock out device and others could be used in the alternative.

Referring to FIG. 1, in operation, when the panel 12 is lifted, the front wall 44 of the storage tray 14 rests against the pickup truck 22 keeping the storage tray 14 generally parallel with the ground while allowing the panel 12 to open. Referring to FIG. 3, the storage tray 14 is allowed to rotate about pivot axis A until the link assemblies 18, 20 become taut, thus preventing further rotation. When the link assemblies 18, 20 are taut and the panel 12 is in the open position, the storage tray 14 is presented at a level which allows for easy access to the interior of the storage tray 14, as shown in FIG. 2.

Referring again to FIG. 1, when the panel 12 is closed, the bottom portion 52 of the tray 14 opposite the front wall 44 contacts the pickup truck 22, thereby preventing the front wall 44 from moving but allowing for rotation of the storage tray assembly 10 about pivot axis A relative to the panel 12. The pickup truck bed 22 holds the storage tray assembly 10 against the panel 12 when in the closed position creating a lid which prevents spillage of the contents within the storage tray 14.

Referring to FIG. 4, the storage tray 14 of the tonneau cover assembly 10 may be locked out by aligning the tray opening 66 with the tonneau opening 68 and inserting the lockout pin 70 through both openings 66, 68. The storage tray 14 is then held in place relative to the tonneau cover 12 when being opened which allows for access to the cargo bed 21 of the pickup truck 22.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A tonneau cover assembly adapted to be secured to a vehicle having a cargo bed and a sidewall disposed adjacent thereto, said tonneau cover assembly comprising:

a panel extending between first and second side edges and front and rear edges, said panel movable between an open position and a closed position;

a hinge mechanism including first and second attachment brackets, said second attachment bracket fixedly secured to said panel;

a link mechanism extending between first and second link ends, said first link end fixedly secured to said panel; and a storage tray secured to said second link end and said first attachment bracket such that said storage tray is supported by said panel and moves relative thereto when said panel moves.

2. A tonneau cover assembly as set forth in claim 1 wherein said storage tray includes a positioning ledge for abutting the sidewall when said panel is moving to and from said open position such that said storage tray remains horizontal as said panel moves to and from said open position.

3. A tonneau cover assembly as set forth in claim 2 including a locking mechanism for securing said storage tray to said panel to maintain said storage tray in a position abutting said panel preventing access to said storage tray.

4. A tonneau cover assembly as set forth in claim 3 wherein said link mechanism is longer than said hinge mechanism allowing a portion of said storage tray disposed adjacent said link mechanism to move from said panel a distance greater than a second portion of said storage tray disposed adjacent said hinge mechanism.

5. A tonneau cover assembly as set forth in claim 4 wherein said link mechanism includes first and second links.

6. A tonneau cover assembly as set forth in claim 5 wherein said first link is rotatably secured to said storage tray.

7. A tonneau cover assembly as set forth in claim 6 wherein said second link is rotatably secured to said panel.

8. A tonneau cover assembly as set forth in claim 7 wherein said first and second link are rotatably connected to each other.

9. A tonneau cover assembly as set forth in claim 8 wherein said locking mechanism includes a pin.

10. A tonneau cover assembly as set forth in claim 9 wherein said locking mechanism further includes a hole extending through said storage tray for receiving said pin therethrough.

11. A tonneau cover assembly as set forth in claim 10 wherein said locking mechanism further includes a second hole extending through said panel for receiving said pin therethrough when said storage tray is abutting said panel whereby said pin prevents said storage tray from moving away from said panel as said panel moves toward said open position.

12. A tonneau cover assembly adapted to be secured to a vehicle having a cargo bed and a sidewall disposed adjacent thereto, said tonneau cover assembly comprising:

a panel extending between first and second side edges and front and rear edges, said panel movable between an open position and a closed position;

a hinge mechanism including first and second attachment brackets, said second attachment bracket fixedly secured to said panel;

a link mechanism extending between first and second link ends, said first link end fixedly secured to said panel;

a storage tray secured to said second link end and said first attachment bracket such that said storage tray is supported by said panel and moves relative thereto when said panel moves; and a locking mechanism for securing said storage tray to said panel to maintain said storage tray in a position abutting said panel preventing access to said storage tray.

13. A tonneau cover assembly as set forth in claim 12 wherein said storage tray includes a positioning ledge for abutting the sidewall when said panel is moving to and from said open position such that said storage tray remains horizontal as said panel moves to and from said open position.

14. A tonneau cover assembly as set forth in claim 13 wherein said link mechanism is longer than said hinge mechanism allowing a portion of said storage tray disposed adjacent said link mechanism to move from said panel a distance greater than a second portion of said storage tray disposed adjacent said hinge mechanism.

15. A tonneau cover assembly as set forth in claim 13 wherein said link mechanism includes first and second links.

16. A tonneau cover assembly as set forth in claim 15 wherein said first link is rotatable secured to said storage tray.

17. A tonneau cover assembly as set forth in claim 16 wherein said second link is rotatably secured to said panel.

18. A tonneau cover assembly as set forth in claim 16 wherein said first and second link are rotatably connected to each other.

19. A tonneau cover assembly as set forth in claim 18 wherein said locking mechanism includes a pin.

20. A tonneau cover assembly as set forth in claim 19 wherein said locking mechanism further includes a hole extending through said storage tray for receiving said pin therethrough.

21. A tonneau cover assembly as set forth in claim 20 wherein said locking mechanism further includes a second hole extending through said panel for receiving said pin therethrough when said storage tray is abutting said panel whereby said pin prevents said storage tray from moving away from said panel as said panel moves toward said open position.

* * * * *

UNITED STATES PATENT AND TRADEMARK OFFICE
CERTIFICATE OF CORRECTION

PATENT NO.     : 6,513,851 B2
DATED          : February 4, 2003
INVENTOR(S)    : Henderson It is certified that error appears in the above-identified patent and that said Letters Patent is hereby corrected as shown below:

Column 2,
Line 25, delete "links" and insert -- link -- therefor.
Line 36, delete "10" and insert -- 14 -- therefor.
Lines 48-49, delete "storage tray" and insert -- tonneau cover -- therefor.

Column 3,
Lines 2-3 and 4, delete "storage tray" and insert -- tonneau cover -- therefor.
Line 64, delete "link" and insert -- links -- therefor.

Column 4,
Line 46, delete "rotatable" and insert -- rotatably -- therefor.
Line 51, delete "link" and insert -- links -- therefor.

Signed and Sealed this

Thirteenth Day of May, 2003

JAMES E. ROGAN
*Director of the United States Patent and Trademark Office*